(12) United States Patent
Batty, Jr. et al.

(10) Patent No.: US 10,785,988 B2
(45) Date of Patent: Sep. 29, 2020

(54) POULTRY DEFEATHERING APPARATUS

(71) Applicants: Harry Alfred Batty, Jr., Sherrills Ford, NC (US); Ellis Clif Haislip, Laurel Hill, NC (US); Brandon Daniel Poston, Cherryville, NC (US); Meir Toshav, Floral Park, NY (US)

(72) Inventors: Harry Alfred Batty, Jr., Sherrills Ford, NC (US); Ellis Clif Haislip, Laurel Hill, NC (US); Brandon Daniel Poston, Cherryville, NC (US); Meir Toshav, Floral Park, NY (US)

(73) Assignee: Mattco Industrial Products, LLC, Denver, NC (US)

( * ) Notice: Subject to any disclaimer, the term of this patent is extended or adjusted under 35 U.S.C. 154(b) by 0 days.

(21) Appl. No.: 16/389,047

(22) Filed: Apr. 19, 2019

(65) Prior Publication Data
US 2019/0320668 A1    Oct. 24, 2019

Related U.S. Application Data

(60) Provisional application No. 62/659,874, filed on Apr. 19, 2018.

(51) Int. Cl.
*A22C 21/02* (2006.01)
*B25J 15/12* (2006.01)
*B25J 11/00* (2006.01)

(52) U.S. Cl.
CPC ............ *A22C 21/022* (2013.01); *A22C 21/02* (2013.01); *B25J 11/0045* (2013.01); *B25J 15/12* (2013.01)

(58) Field of Classification Search
CPC ....... A22C 21/02; A22C 21/022; A22C 21/028
USPC ....................................... 452/88, 93
See application file for complete search history.

(56) References Cited

U.S. PATENT DOCUMENTS

| 3,218,668 | A | * | 11/1965 | Engkjer | A22C 21/022 |
|           |   |   |         |         | 452/91 |
| 4,175,302 | A | * | 11/1979 | Scheier | A22C 21/02 |
|           |   |   |         |         | 452/93 |
| 6,918,825 | B2 | * | 7/2005 | Conaway | A22C 21/02 |
|           |    |   |        |         | 452/88 |
| 7,066,805 | B2 | * | 6/2006 | Turner | A22C 21/022 |
|           |    |   |        |        | 452/88 |

(Continued)

*Primary Examiner* — David J Parsley
(74) *Attorney, Agent, or Firm* — Blake E. Vande Garde; Erickson Kernell IP, LLC

(57) ABSTRACT

A poultry defeathering apparatus comprising a compression plate with a central aperture operationally associated with a hub drive shaft of a feather plucking machine, wherein the compression plate is secured to the hub drive shaft, a finger plate operationally associated with the hub drive shaft and the compression plate, the finger plate includes a central aperture, an annular abutment ring operationally associated with the central aperture, a plurality of finger apertures surrounding the central aperture, a plurality of fingers secured to the finger plate by insertion through the finger plate, with the body extending through a finger aperture, wherein the hub drive shaft is secured to the finger plate and wherein the oversized base of each finger is compressed between the compression plate and the finger plate and a mounting bolt secured on the finger plate within the mounting hole of the hub drive shaft.

7 Claims, 4 Drawing Sheets

(56) References Cited

U.S. PATENT DOCUMENTS

| | | | |
|---|---|---|---|
| 7,070,494 B2 * | 7/2006 | Rapp .................... | A22C 21/022 452/88 |
| 9,332,768 B2 * | 5/2016 | Goodyear, Jr. ...... | A22C 21/022 |

* cited by examiner

POULTRY DEFEATHERING APPARATUS

FIELD OF INVENTION

The present invention pertains poultry defeathering devices and more specifically to a device with a mounting structure which facilitates the efficient and simple removal and replacement of the fingers used by the device as they wear out.

BACKGROUND OF THE INVENTION

Millions of tons of poultry are raised, processed and brought to market yearly throughout the world. In 2016, in the United States alone, over 8.78 billion broiler chickens were produced and over 244 million turkeys were produced with a value in excess of $32 billion dollars. Poultry is processed in an efficient manner by shackling, stunning, bleeding, scalding, picking, eviscerating, washing, chilling, carving and deboning. Machines replaced workers plucking the feathers of poultry in poultry plants decades ago. Modern picking machines generally include a disc or drum onto which fingers are secured. Several discs are positioned along the sides of a path traversed by a chain/shackle carrying the poultry through the machine. The discs are rapidly rotated, ensuring that the fingers contact as much of the outer surface of each bird as possible. These fingers then "pick" the feathers off each poultry carcass as it passes through the machine via chain/shackle. Unfortunately, the fingers often crack, break or wear out at a significant rate due to the friction involved in the de-feathering process. This makes it necessary to replace thousands of fingers each month for each processing line.

A plurality of fingers are mounted to each disc or drum. Fingers are generally shaped having a larger base, a tapered body and a smaller diameter tip end. The tapered body is often ribbed, and most fingers include a groove located next to the base. Each disc has a plurality of openings large enough for the body of each finger to fit through, but small enough to abut the base diameter. Each finger is secured by pulling the finger through a hole and seating the hole within the finger groove. A typical picking line will include four defeathering machines. Each machine has 640 or more fingers making each line use in excess of 2500 fingers to de-feather poultry and each machine utilizes water sprays to continually wash feathers off both the fingers and the poultry as its processed. This creates a very slippery environment.

Replacement of fingers in previous plucking machines is both difficult and time consuming. Each finger must first be cut off by hand. This process is labor intensive and dangerous as it involves the use of a blade in a tight, awkward environment. A replacement finger is then inserted into the vacant opening and pulled, often with some form of plier, to seat the opening within the groove. Plucking machines utilizing a plurality of feather stripping fingers are the favored method for de-feathering chickens. Unfortunately, the design is lacking in efficient finger replacement.

Thus, there is clearly a need for a more efficient and less dangerous device and method to facilitate the removal and replacement of fingers within a picking machine. The instant invention alleviates several of the issues detailed above.

SUMMARY OF THE INVENTION

A poultry defeathering apparatus comprising a compression plate with a central aperture operationally associated with a hub drive shaft of a feather plucking machine, wherein the compression plate is secured to the hub drive shaft, a finger plate operationally associated with the hub drive shaft and the compression plate, the finger plate includes a central aperture, an annular abutment ring operationally associated with the central aperture, a plurality of finger apertures surrounding the central aperture, a plurality of fingers secured to the finger plate by insertion through the finger plate, with the body extending through a finger aperture, wherein the hub drive shaft is secured to the finger plate and wherein the oversized base of each finger is compressed between the compression plate and the finger plate and a mounting bolt secured on the finger plate within the threaded hole of the hub drive shaft.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

Figure 1:
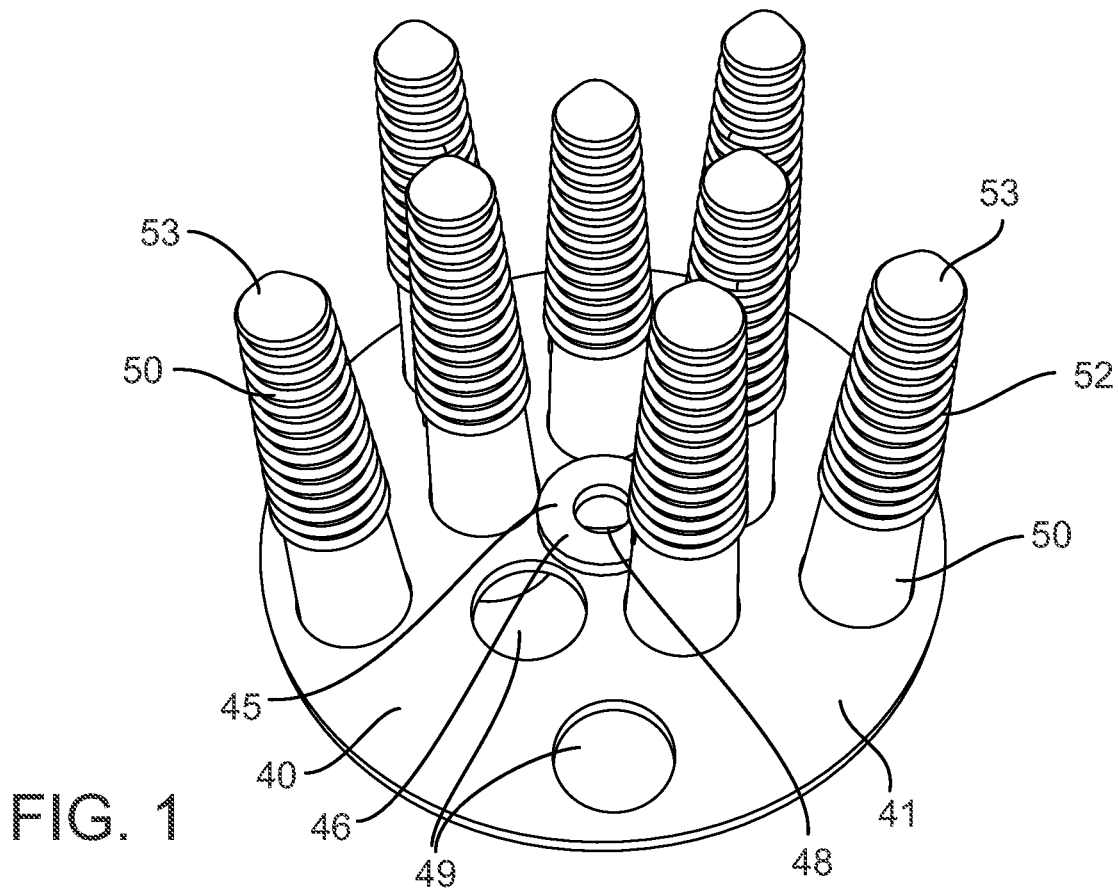
FIG. 1 is a front, proximal view of a finger plate and a plurality of fingers in one embodiment of the instant invention.
Figure 2:
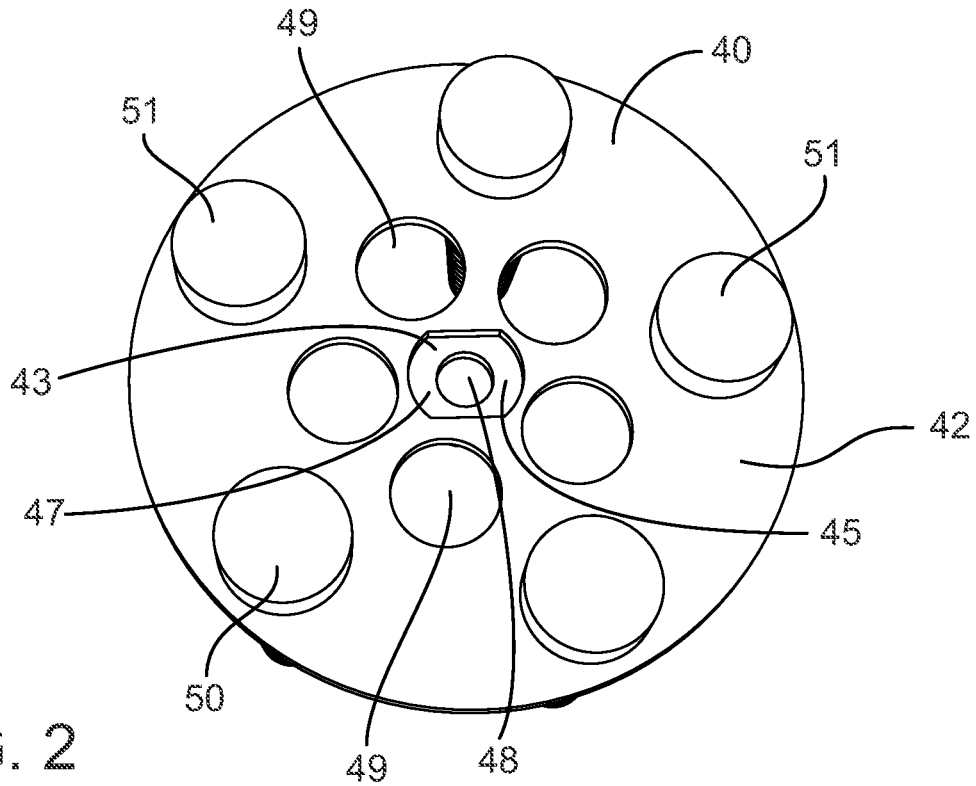
FIG. 2 is a rear view of a finger plate and a plurality of fingers in one embodiment of the instant invention.
Figure 3:
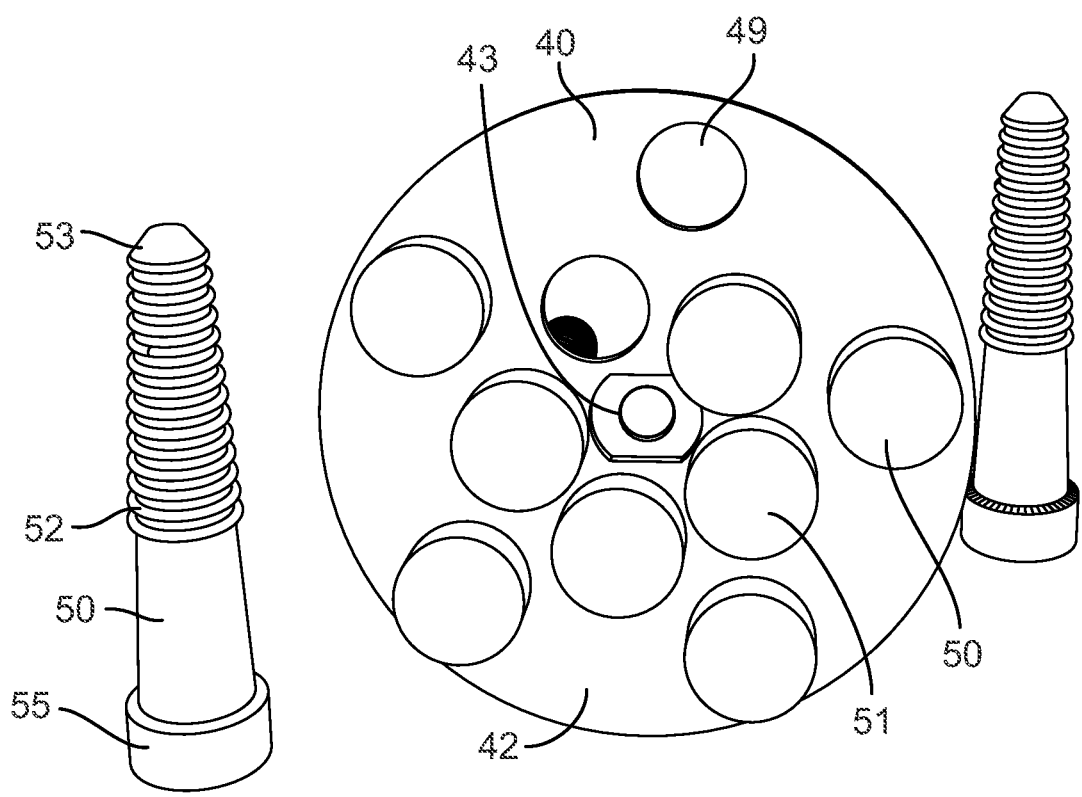
FIG. 3 is a rear view of a finger plate and a plurality of fingers in one embodiment of the instant invention.
Figure 4:
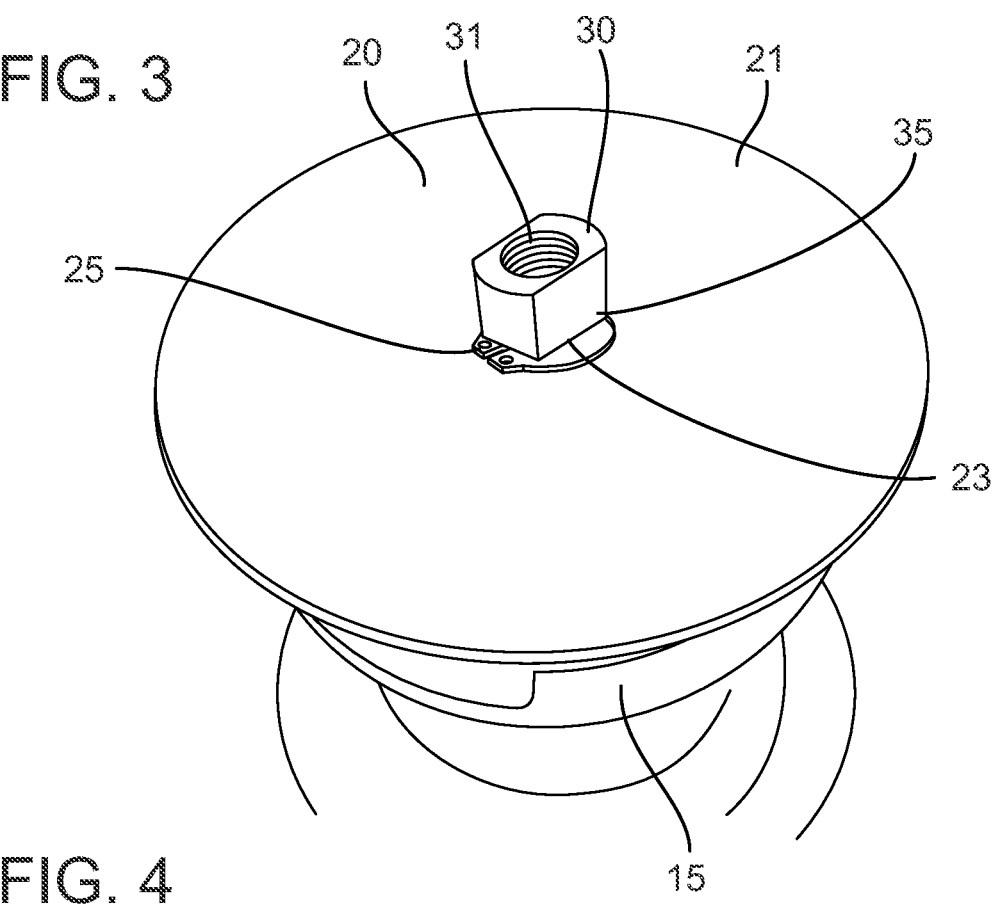
FIG. 4 is a front, proximal view of a compression plate mounted on a hub in one embodiment of the instant invention.
Figure 5:
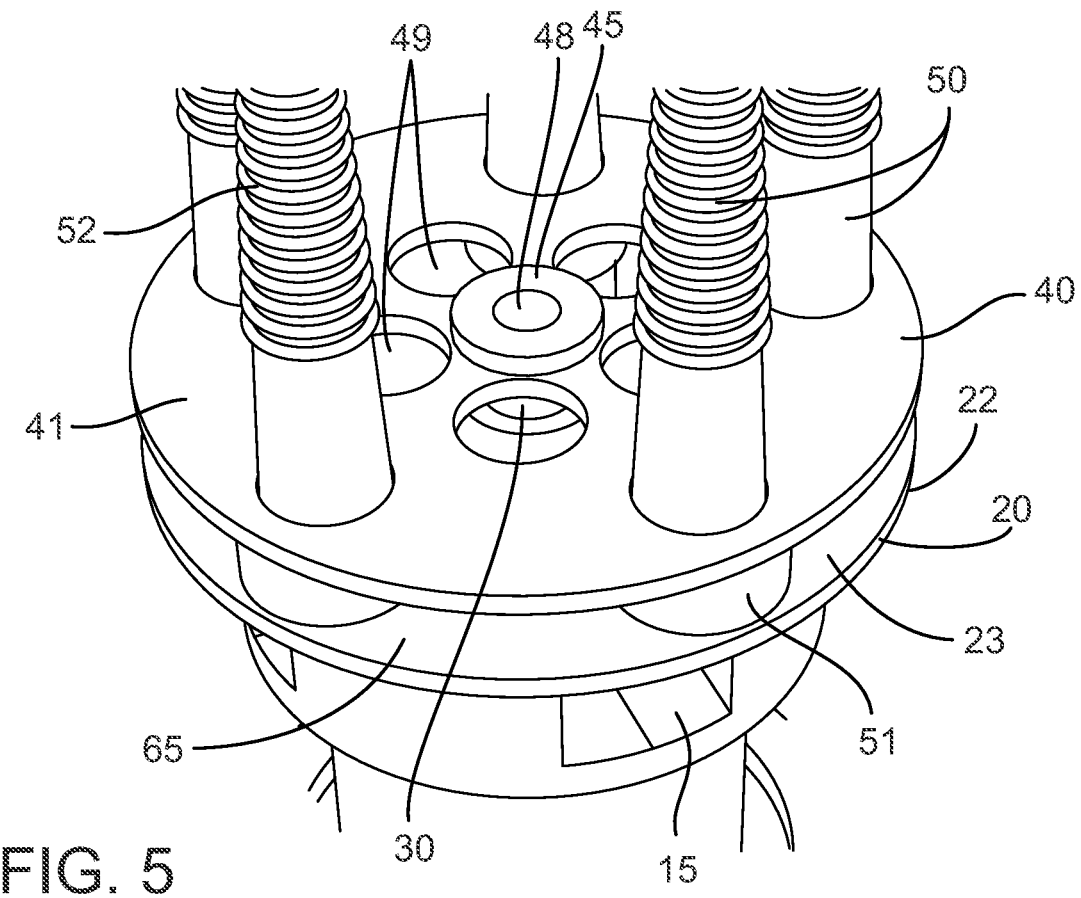
FIG. 5 is a front, proximal view of one embodiment of a poultry defeathering apparatus of the instant invention.
Figure 6:
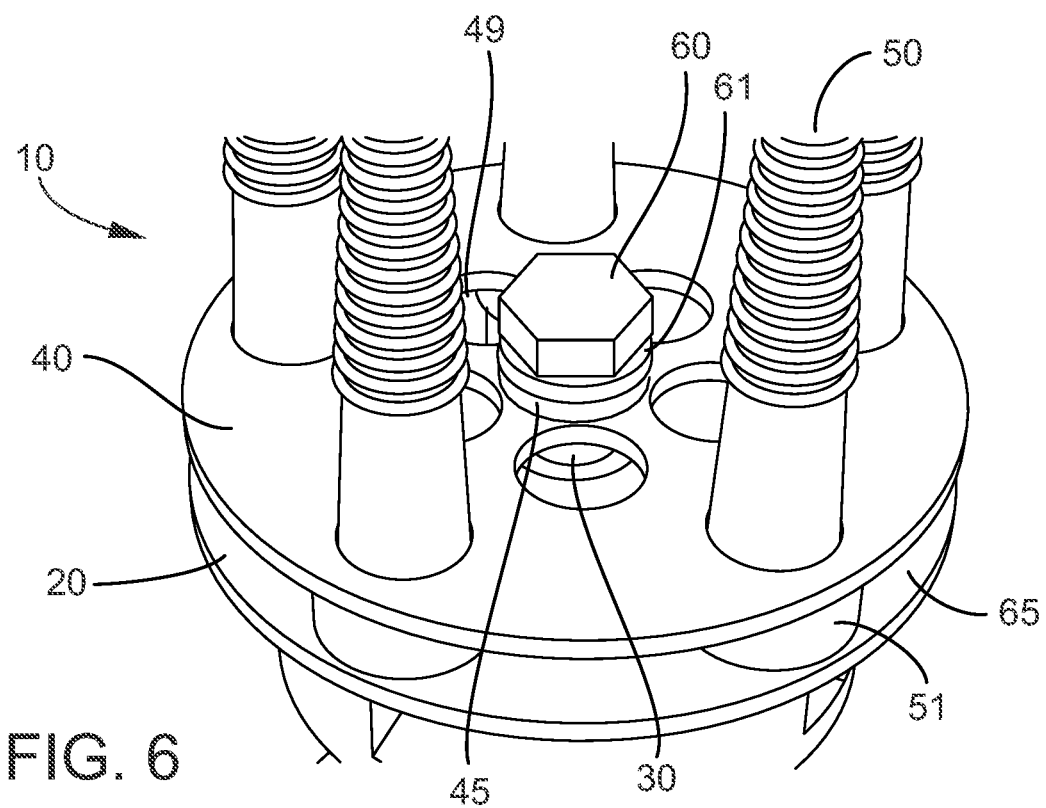
FIG. 6 is a front, proximal view of one embodiment of a poultry defeathering apparatus of the instant invention.
Figure 7:
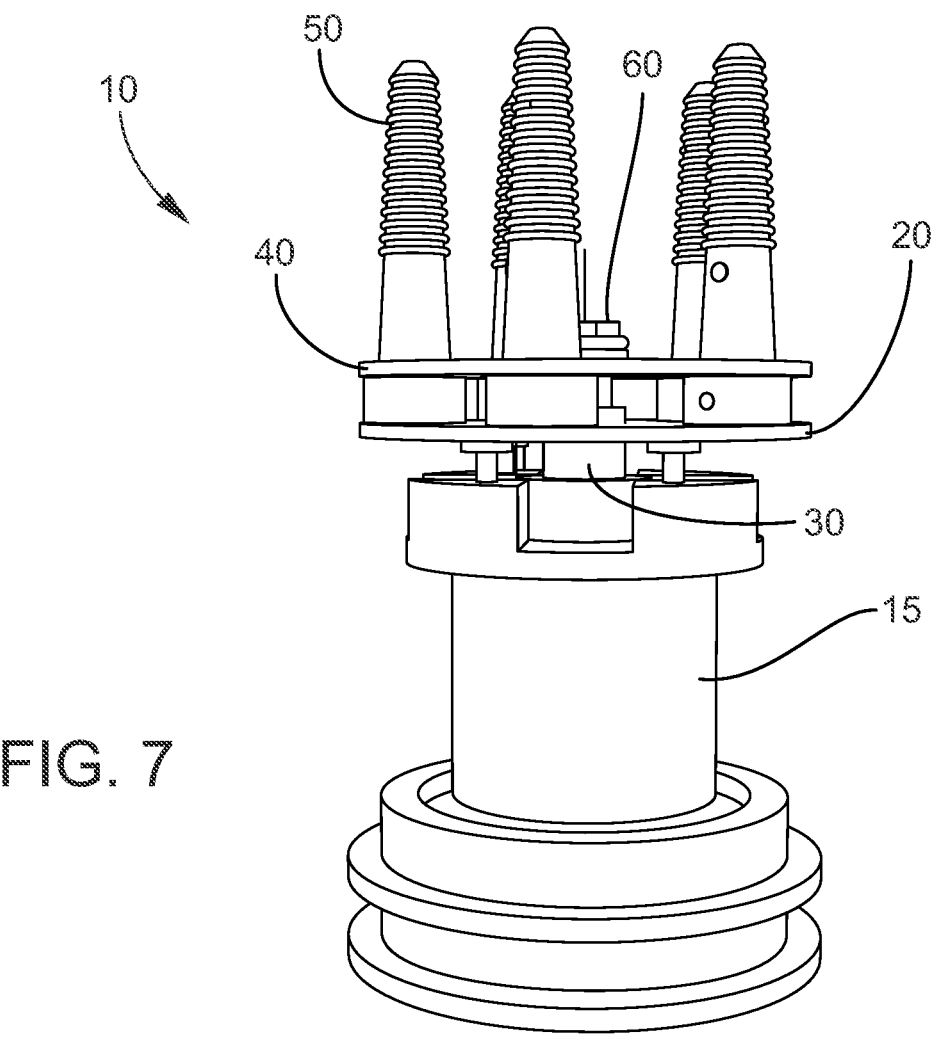
FIG. 7 is a side view of one embodiment of a poultry defeathering apparatus of the instant invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Looking to the Figures, there are illustrated various embodiments of the instant invention. The instant invention discloses a poultry defeathering apparatus 10 comprising a compression plate 20 with a central aperture 23 operationally associated with a hub drive shaft 30 of a feather plucking machine, wherein the compression plate 20 is secured to the hub drive shaft 30, a finger plate 40 operationally associated with the hub drive shaft 30 and the compression plate 20, the finger plate 40 includes a central aperture 43, an annular abutment ring 45 operationally associated with the central aperture 43, a plurality of finger apertures 49 surrounding the central aperture 43, a plurality of fingers 50 secured to the finger plate 40 by insertion through the finger plate 40, with a body 52 extending through a finger aperture 49, wherein the hub drive shaft 30 is secured to the finger plate 40 and wherein an oversized base 51 of each finger is compressed between the compression plate 20 and the finger plate 40 and a mounting bolt 60 secured on the finger plate 40 within a threaded hole 31 of the hub drive shaft 30.

Looking more closely, there is illustrated in FIGS. 1-7 an embodiment of a poultry defeathering apparatus 10 comprising a compression plate 20 which includes a front side 21, a back side 22 and a central aperture 23 operationally associated with a hub drive shaft 30 of a feather plucking machine (not illustrated). The compression plate 20 is constructed of any material resilient enough to hold up to the environment within a feather plucking machine for an extended time period. Materials include, but are not limited to, metal, plastics, resins, or a combination thereof.

The hub drive shaft 30 extends out of a hub 15 and is designed to rotate the compression plate 20, the finger plate 40 and all associated fingers 50. The hub drive shaft is generally made of metal has a threaded hole 31 located at approximately the center of the hub drive shaft 30. The hub drive shaft generally has a shape selected from oblong, square, rectangular, hexagonal, octagonal, or a combination thereof. The compression plate 20 is operationally associated with the hub drive shaft 30 and is secured to the hub drive shaft by inserting the hub drive shaft through the central aperture 23 which is shaped to accept the shape of the hub drive shaft 30 snugly. In one embodiment of the instant invention, the hub drive shaft 30 is made of any material resilient enough for extended use on a hub 15 used to defeather poultry and the hole 31 located at approximately the center of the hub drive shaft 30 is a mounting hole designed to accept a fastener, mounting bolt or a stud/nut combination.

The instant invention further includes a finger plate 40 operationally associated with the hub drive shaft 30 and the compression plate 20. The finger plate 40 includes a front side 41, a back side 42, a central aperture 43 and an annular abutment ring 45 secured to the front side 41 of the finger plate and operationally associated with the central aperture 43. The central aperture 43 is shaped to accept the shape of the hub drive shaft 30 snugly, stopping when it engages the annular abutment ring 45. The annular abutment ring 45 includes a front 46, a back 47 and a central aperture 48. The annular abutment ring is secured to the front side 41 of the finger plate, covering the central aperture 43. The abutment ring 45 may be permanent or removeable. The central aperture 48 of the abutment ring 45 is a different shape than the central apertures 23, 43 of the compression plate 20 and the finger plate 40. The central aperture 48 of the abutment ring is operationally associated with a mounting bolt 60 or a stud/nut combination which is sized to pass through the central aperture 48 and engage the threaded hole 31 of the hub drive shaft 30. The abutment ring 45 is constructed of any material resilient enough to hold up to the environment within a feather plucking machine for an extended time period. Materials include, but are not limited to, metal, plastics, resins, or a combination thereof.

The finger plate 40 further includes a plurality of finger apertures 49 surrounding the central aperture 43. The finger apertures 49 are sized to accept and secure a finger 50 or similar device. The finger plate 40 is constructed of any material resilient enough to hold up to the environment within a feather plucking machine for an extended time period. Materials include, but are not limited to, metal, plastics, resins, or a combination thereof.

Figure 8:
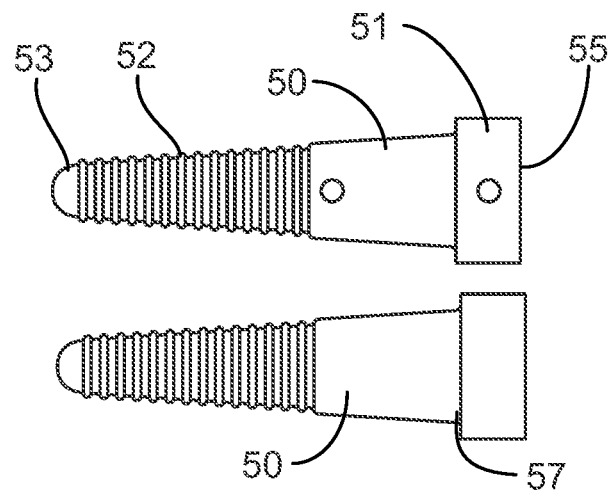
FIG. 8 is a side view of one embodiment of fingers of the instant invention.

The invention further includes a plurality of fingers 50 comprising an oversized base 51 and a body 52 extending from the base. Each finger has an end 55 located on its base 51 and a tip 53 located on its opposite side (see FIG. 8). Each finger 50 is adapted to be secured to the finger plate 40 by insertion through the back side 42 of the finger plate, with the body extending through a finger aperture 49 and through to the front side 41 of the finger plate with the oversized base 51 being retained on the back side 42 of the finger plate 40. Fingers 50 are made of a natural rubber, a synthetic rubber, plastic, polymer, or a combination thereof. Each finger provides adequate friction to effectively remove feathers from a poultry carcass while also being flexible enough to avoid bruising or damaging the poultry during the defeathering process. In one embodiment of the instant invention, the fingers 50 are made from a material selected from the group consisting of natural rubber, a synthetic rubber, plastic, polymer, styrene-butadiene rubber, isoprene rubber, butadiene rubber, ethylene-propylene rubber, butyl rubber, chloroprene rubber, nitrile rubber, and combinations thereof. The composition of the fingers may further include various additives such as pigments, tackifiers, anti-ultraviolet and/or anti-oxidants.

In one embodiment of the instant invention, the fingers 50 are tapered beginning at the base 51 and decreasing in size as the body 52 extends away from the base to the tip 53. In still another embodiment, the base 51 of each finger 50 has a shape selected from the group including: flat, convex, concave, or a combination thereof. In one embodiment of the instant invention, the finger 50 includes a groove 57 located between the oversized base 51 and the body 52 (see FIG. 8). In another embodiment of the instant invention, the fingers may be joined together at the base, creating a pair of fingers 50 which are joined at their bases by an extension which allows both fingers 50 to be mounted into a pair of finger apertures 49. The extension engages each base 51, extending laterally to form a bridge (not illustrated). The extension may have the same thickness as the base 51 or it may be narrower than the base 51. In another embodiment of the instant invention, the fingers may be joined together at the base, creating a trio of fingers 50 which are joined at their bases by an extension which allows both fingers 50 to be mounted into a trio of finger apertures 49. The extension engages each base 51, extending laterally to form a bridge (not illustrated). The extension may have the same thickness as the base 51 or it may be narrower than the base 51. In another embodiment of the instant invention, a plurality of fingers may be joined together at the base, creating a plurality of fingers 50 which are joined at their bases by an extension which allows the plurality of fingers 50 to be mounted into a plurality of finger apertures 49. The number of fingers 50 joined together and the configuration of fingers 50 may be adjusted to fit 2, 3, 4, 5, 6, 7, 8, 9, 10, 11 or 12 finger apertures 49 in a finger plate 40 while also containing an aperture allowing access to the central aperture 48 of the finger plate 40. The extension engages each base 51, extending laterally to form a bridge (not illustrated). The extension may have the same thickness as the base 51 or it may be narrower than the base 51.

As stated previously, the hub drive shaft 30 is secured to the finger plate 40 by passing through the central aperture 43 and engaging the annular abutment ring 45 which compresses the oversized base 51 of each finger 50 between the compression plate 20 and the finger plate 40 to hold each finger 50 substantially stationary during use. A mounting bolt 60 or a stud/nut combination is passed through a washer 61 and engaged to the threaded hole 31 of the hub drive shaft 30 and secured on the front side 41 of the finger plate 40. In one embodiment of the instant invention, the compression plate 20 is secured to the hub drive shaft 30 with the assistance of a fastener 25. The fastener 25 may be a snap ring, a retaining ring or a combination thereof.

Another embodiment of the instant invention discloses a poultry defeathering apparatus 10 comprising a compression plate 20 comprising a front side 21, a back side 22, a central aperture 23 operationally associated with a hub drive shaft 30 of a feather plucking machine wherein the hub drive shaft 30 has a mounting hole and wherein the compression plate 20 is secured to the hub drive shaft 30 by inserting the hub drive shaft 30 through the central aperture 23. A finger plate 40 is operationally associated with the hub drive shaft 30 and the compression plate 20, the finger plate comprising a front side 41, a back side 42, a central aperture 43, an annular abutment ring 45 secured to the front side 41 of the finger plate 40 and operationally associated with the central aperture 43, a plurality of finger apertures 49 surrounding the central aperture 43, a plurality of fingers 50 comprising an oversized base 51 and a body 52 extending from the base 51 wherein each finger 50 is adapted to be secured to the finger plate 40 by insertion through the back side 42 of the finger plate 40, with the body 52 extending through a finger aperture 49 and through to the front side 41 of the finger plate 40 and the oversized base 51 being retained on the back side 42 of the finger plate 40, wherein to the hub drive shaft 30 is secured to the finger plate 40 by passing through the central aperture 43 and engaging the annular abutment ring 45 and wherein the oversized base 51 of each finger 50 is compressed between the compression plate 20 and the finger plate 40 and held substantially stationary during use and a mounting bolt 60 secured on the front side 41 of the finger plate 40 within the mounting hole 31 of the hub drive shaft 30. Each of the elements in the embodiments listed previously can be incorporated into this embodiment.

The instant invention also includes a method of changing out a finger on a poultry defeathering apparatus 10 comprising the steps of:
(a) providing the poultry defeathering apparatus 10 comprising:
  a. a compression plate 20 which includes a front side 21, a back side 22 and a central aperture 23 operationally associated with a hub drive shaft 30 of a feather plucking machine, wherein the hub drive shaft 30 has a threaded hole 31 in its center and wherein the compression plate 20 is secured to the hub drive shaft 30 by inserting the hub drive shaft 30 through the central aperture 23;
  b. a finger plate 40 operationally associated with the hub drive shaft 30 and the compression plate 20, the finger plate includes a front side 41, a back side 42, a central aperture 43, an annular abutment ring 45 secured to the front side 41 of the finger plate 40 and operationally associated with the central aperture 43 and a plurality of finger apertures 49 surrounding the central aperture 43;
  c. a plurality of fingers 50 comprising an oversized base 51 and a body 52 extending from the base, wherein each finger 50 is adapted to be secured to the finger plate 40 by insertion through the back side 42 of the finger plate, with the body 52 extending through a finger aperture 49 and through to the front side 41 of the finger plate and the oversized base 51 being retained on the back side 42 of the finger plate, wherein to the hub drive shaft 30 is secured to the finger plate 42 by passing through the central aperture 43 and engaging the annular abutment ring 45 and wherein the oversized base 51 of each finger is compressed between the compression plate 20 and the finger plate 40 and held substantially stationary during use; and
  d. a mounting bolt 60 is secured on the front side 41 of the finger plate within the threaded hole 31 of the hub drive shaft 30;
(b) removing the mounting bolt 60 from within the threaded hole 31 of the hub drive shaft 30;
(c) removing the finger plate 40 from the hub drive shaft 30, exposing an end 55 of the base 51 of the plurality of fingers mounted within the finger apertures 49;
(d) grasping and removing one or more fingers 50 from the finger plate leaving one or more open finger apertures;
(e) inserting a replacement finger into each open finger aperture;
(f) securing the finger plate 40 to the hub drive shaft 30 by passing through the central aperture 43 and engaging the annular abutment ring 45,
(g) inserting the mounting bolt 60 into the threaded hole 31 of the hub drive shaft,
(h) tightening the mounting bolt 60 into the threaded hole 31 of the hub drive shaft, compressing the oversized base 51 of each finger between the compression plate 20 and the finger plate 40 and securing the finger plate to the hub drive shaft 30.

The instant invention also includes a method of changing out a finger on a poultry defeathering apparatus 10 comprising the steps of:
(a) providing the poultry defeathering apparatus 10 comprising:
  a. a compression plate 20 which includes a front side 21, a back side 22 and a central aperture 23 operationally associated with a hub drive shaft 30 of a feather plucking machine, wherein the hub drive shaft 30 has a mounting hole 31 in its center and wherein the compression plate 20 is secured to the hub drive shaft 30 by inserting the hub drive shaft 30 through the central aperture 23;

b. a finger plate 40 operationally associated with the hub drive shaft 30 and the compression plate 20, the finger plate includes a front side 41, a back side 42. a central aperture 43, an annular abutment ring 45 secured to the front side 41 of the finger plate 40 and operationally associated with the central aperture 43 and a plurality of finger apertures 49 surrounding the central aperture 43;

c. a plurality of fingers 50 comprising an oversized base 51 and a body 52 extending from the base, wherein each finger 50 is adapted to be secured to the finger plate 40 by insertion through the back side 42 of the finger plate, with the body 52 extending through a finger aperture 49 and through to the front side 41 of the finger plate and the oversized base 51 being retained on the back side 42 of the finger plate, wherein to the hub drive shaft 30 is secured to the finger plate 42 by passing through the central aperture 43 and engaging the annular abutment ring 45 and wherein the oversized base 51 of each finger is compressed between the compression plate 20 and the finger plate 40 and held substantially stationary during use; and d. a mounting bolt 60 is secured on the front side 41 of the finger plate within the mounting hole 31 of the hub drive shaft 30;

(b) removing the mounting bolt 60 from within the mounting hole 31 of the hub drive shaft 30;

(c) removing the finger plate 40 from the hub drive shaft 30, exposing an end 55 of the base 51 of the plurality of fingers mounted within the finger apertures 49;

(d) grasping and removing one or more fingers 50 from the finger plate leaving one or more open finger apertures;

(e) inserting a replacement finger into each open finger aperture;

(f) securing the finger plate 40 to the hub drive shaft 30 by passing through the central aperture 43 and engaging the annular abutment ring 45, (g) inserting the mounting bolt 60 into the mounting hole 31 of the hub drive shaft, (h) tightening the mounting bolt 60 into the mounting hole 31 of the hub drive shaft, compressing the oversized base 51 of each finger between the compression plate 20 and the finger plate 40 and securing the finger plate to the hub drive shaft 30.

The instant invention also includes a method of defeathering poultry using one or more poultry defeathering apparatus 10 comprising the steps of:

(a) providing the poultry defeathering apparatus 10 comprising:

a. a compression plate 20 which includes a front side 21, a back side 22 and a central aperture 23 operationally associated with a hub drive shaft 30 of a feather plucking machine, wherein the hub drive shaft 30 has a threaded hole 31 in its center and wherein the compression plate 20 is secured to the hub drive shaft 30 by inserting the hub drive shaft 30 through the central aperture 23;

b. a finger plate 40 operationally associated with the hub drive shaft 30 and the compression plate 20, the finger plate includes a front side 41, a back side 42. a central aperture 43, an annular abutment ring 45 secured to the front side 41 of the finger plate 40 and operationally associated with the central aperture 43 and a plurality of finger apertures 49 surrounding the central aperture 43;

c. a plurality of fingers 50 comprising an oversized base 51 and a body 52 extending from the base, wherein each finger 50 is adapted to be secured to the finger plate 40 by insertion through the back side 42 of the finger plate, with the body 52 extending through a finger aperture 49 and through to the front side 41 of the finger plate and the oversized base 51 being retained on the back side 42 of the finger plate, wherein to the hub drive shaft 30 is secured to the finger plate 42 by passing through the central aperture 43 and engaging the annular abutment ring 45 and wherein the oversized base 51 of each finger is compressed between the compression plate 20 and the finger plate 40 and held substantially stationary during use; and d. a mounting bolt 60 is secured on the front side 41 of the finger plate within the threaded hole 31 of the hub drive shaft 30;

(b) rotating the poultry defeathering apparatus 10 and the plurality of fingers 50 about an axis by rotating the hub drive shaft 30; and (c) causing a poultry carcass to contact the plurality of fingers 50.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

The invention claimed is:

1. A method of changing out a finger on a poultry defeathering apparatus comprising the steps of:

a. providing the poultry defeathering apparatus comprising:

a compression plate comprising:
a front side;
a back side;
a central aperture operationally associated with a hub drive shaft of a feather plucking machine;
wherein the hub drive shaft has a threaded hole;
wherein the compression plate is secured to the hub drive shaft by inserting the hub drive shaft through the central aperture;

a finger plate operationally associated with the hub drive shaft and the compression plate, the finger plate comprising:
a front side;

a back side;

a central aperture;

an annular abutment ring secured to the front side of the finger plate and operationally associated with the central aperture; and a plurality of finger apertures surrounding the central aperture;

a plurality of fingers comprising an oversized base and a body extending from the base;

wherein each finger is adapted to be secured to the finger plate by insertion through the back side of the finger plate, with the body extending through a finger aperture and through to the front side of the finger plate and the oversized base being retained on the back side of the finger plate;

wherein the hub drive shaft is secured to the finger plate by passing through the central aperture and engaging the annular abutment ring; and wherein the oversized base of each finger is compressed between the compression plate and the finger plate and held substantially stationary during use; and a mounting bolt secured on the front side of the finger plate within the threaded hole of the hub drive shaft;

b. removing the mounting bolt from within the threaded hole of the hub drive shaft;

c. removing the finger plate from the hub drive shaft, exposing an end of the base of the plurality of fingers mounted within the finger apertures;

d. grasping and removing one or more fingers from the finger plate leaving one or more open finger apertures;

e. inserting a replacement finger into each open finger aperture;

f. securing the finger plate to the hub drive shaft by passing through the central aperture and engaging the annular abutment ring, g. inserting the mounting bolt into the threaded hole of the hub drive shaft, and h. tightening the mounting bolt into the threaded hole of the hub drive shaft, compressing the oversized base of each finger between the compression plate and the finger plate and securing the finger plate to the hub drive shaft.

2. The method of claim 1 wherein the compression plate is secured to the hub drive shaft with the assistance of a fastener.

3. The method of claim 1 wherein the fingers are tapered beginning at the base and decreasing in size as the body extends away from the base.

4. The method of claim 1 wherein the base of each finger has a shape selected from the group including: flat, convex, concave, or a combination thereof.

5. The method of claim 1 wherein the fingers are made of a natural rubber, a synthetic rubber, or a combination thereof.

6. The method of claim 1 wherein the fingers are made from a material selected from the group consisting of styrene-butadiene rubber, isoprene rubber, butadiene rubber, ethylene-propylene rubber, butyl rubber, chloroprene rubber, nitrile rubber, and combinations thereof.

7. The method of claim 1 wherein the compression plate and the finger plate are made of metal.

* * * * *